Patented June 22, 1948

2,443,902

UNITED STATES PATENT OFFICE 2,443,902

PREPARATION OF DIALKYL-SUBSTITUTED DIHALOGENOSILANES

Charles S. Ferguson, Troy, and Jesse E. Sellers, Scotia, N. Y., assignors to General Electric Company, a corporation of New York No Drawing. Application June 27, 1947, Serial No. 757,666

5 Claims. (Cl. 260—448.2)

This invention is concerned with the preparation of organohalogenosilanes. More particularly, the invention relates to a method for obtaining increased yields of dialkyldihalogenosilanes, especially lower dialkyldihalogenosilanes, which method comprises effecting reaction between an alkyl halide and silicon in the presence of a catalyst comprising a finely divided cupreous powder, the major portion of the particles of which are a few microns in size, and having as a principal constituent friable metallic copper core particles surrounded by protective surface films of cuprous oxide inhibiting oxidation in the air, said films being relatively thin as compared with the size of the enclosed copper cores, the amount of cuprous oxide on the individual cores being at least sufficient to be identified by present X-ray diffraction methods. For brevity this catalyst will hereinafter be referred to as the "cupreous powder."

In Rochow Patent 2,380,995, in Rochow and Patnode Patent 2,380,996 and in Rochow and Gilliam Patent 2,383,818, all of which patents are assigned to the same assignee as the present invention, there are disclosed and claimed methods for preparing organohalogenosilanes by effecting reaction between silicon and a hydrocarbon halide. In the more specific embodiments of the above-patented inventions the hydrocarbon halide is caused to react with the silicon component of a contact mass containing a metallic catalyst for the reaction, for instance, copper, or with a finely divided contact mass comprising silicon and an oxide of copper. By means of these catalyst it was found that increased yields of alkylhalogenosilanes could be obtained.

However, the increase in yield of the alkylhalogenosilanes was attended by several disadvantages. It was quite difficult to predict in advance the proportion of the different alkylhalogenosilanes which would be obtained during the reaction, or even to reproduce within reasonable limits the results obtained in analogous runs even though identical materials were employed. Because of this lack of control, the proportion of the more desirable dialkyldihalogenosilane varied and, in many cases, was quite low.

We have now discovered that from substantial to marked increases in the yields of the dialkyldihalogenosilane can be obtained if the reaction between the heated silicon and alkyl halide is effected in the presence of a catalyst comprising a finely divided cupreous powder, the major portion of the particles of which are a few microns in size, and having as a principal constituent friable metallic copper core particles surrounded by protective surface films of cuprous oxide inhibiting oxidation in the air, said films being relatively thin as compared with the size of the enclosed copper cores, the amount of cuprous oxide on the individual cores being at least sufficient to be identified by present X-ray diffraction methods.

The particular catalyst employed in the practice of our invention is more specifically disclosed and claimed in Hubbell Patent 2,420,540, issued May 13, 1947. Fuller descriptions for the source or method of obtaining the cupreous powder employed in the instant invention will be found in the aforementioned patent.

It was quite surprising and unexpected to find that the use of the cupreous powder as a catalyst resulted in better yields than could be obtained with, e. g., finely divided metallic copper powder or with copper oxide since it was known that the latter two materials when used as catalysts accelerated the reaction between the silicon and alkyl halide to a greater degree than when these two catalysts were omitted.

Moreover, in addition to the increased yields of dialkyldihalogenosilanes obtained, it was also found that the reproducibility of results was very high. For example, the average percentage of dimethyldichlorosilane obtained in six consecutive runs did not vary more than 1 to 3 per cent from the individual yield per cents of dimethyldichlorosilane. This was a material improvement in the preparation of dialkyldihalogenosilanes, since much larger variations in analogous runs were often obtained using other copper or copper-containing catalysts.

The manner in which the silicon and alkyl halide may be caused to react in the presence of the cupreous powder or catalyst is not critical. Thus, for example, the silicon and catalyst may be present in the form of powders, preferably in the form of a finely divided state, positioned in a reaction chamber which is advantageously provided with a means of stirring the mixture of powders. Thereafter the alkyl halide, preferably in the form of a gas or vapor, is directed into the reaction chamber while at the same time heating the chamber and its contents by suitable means.

In order that those skilled in the art may better understand how the present invention may be practiced, the following examples are given by way of illustration and not by way of limitation. The alkyl halide employed in each instance was methyl chloride.

EXAMPLE 1

In each of the following cases the silicon and catalyst, either the finely divided copper oxide or the cupreous powder (each component being in the form of a finely divided powder), were mixed together to form a homogeneous mixture and the mixture of powders was charged to a U-shaped tubular steel reactor ¾ inch in diameter. The reactor with its charge was purged with methyl chloride and then placed in a molten salt bath at the stated starting temperature, usually 300° C. The flow of the methyl chloride gas was adjusted as closely as possible to 5 grams per hour and the product comprising essentially the methylchlorosilanes which issued from the exit end of the tube were condensed at a temperature of from −18° to −20° C. and analyzed. Under these conditions, negligible amounts of unreacted methyl chloride (boiling point −37° C.) would be present in the reaction product. The two following runs were started at 300° C. and after the rate of the product obtained fell below 1.5 cc. per hour for a twelve-hour period, the temperature of the bath was increased to 325° C. This procedure was continued at intervals of 25° C. until a maximum temperature of 400° C. was attained. At this point, the run was discontinued when the product rate fell below 1 cc. per hour. Where the rate of product was maintained at a high level, as in the case of the run using the cupreous powder, only three 25° C. increases in temperature were required to effect practically quantitative utilization of the silicon in the reaction chamber.

During the earlier phases of any of the runs in which reaction is effected between the alkyl halide and the silicon, the amount of dialkyldihalogenosilane in the condensation product may range anywhere from about 35 to 80 per cent, by weight, of the total weight of the product obtained up to that time. Generally, in the type of reaction disclosed above, the proportion, by weight, of the dialkyldihalogenosilane decreases as the silicon component of the contact mass is consumed. It is, therefore, essential that to evaluate properly the effects of a certain mixture of ingredients, due consideration be given to the overall picture. This may require that the per cent of the dialkyldihalogenosilane obtained in the condensed product at the end of a run be properly correlated with the actual amount, by weight, of this compound in the condensed product, the time required to obtain this amount of the compound, the actual per cent of silicon utilized in the preparation of the compound, etc.

In each of the two following runs about 180 grams silicon was mixed with about 25 grams cupric oxide (calculated to contain 20 grams copper) and 20 grams cupreous powder (described in the aforementioned Hubbell patent), respectively. Each mixture of powders was packed into the reaction chamber and methyl chloride was placed over the static bed of heated silicon.

Table 1 shows the conditions of reaction used for each sample. Sample 1 employed the copper oxide while sample 2 used the cupreous powder. The heading "Grams Weight of Reaction Product" is intended to include the entire product obtained by condensing at about −18° to −20° C. the effluent gases resulting from the reaction between the methyl chloride and the silicon.

Table 1

| Sample No. | Length of Run Hours. | Grams Weight of Input CH₃Cl | Grams Weight of Reaction Product | Bath Temperature, °C. |
|---|---|---|---|---|
| 1 | 496 | 3,940 | 690 | 300–400 |
| 2 | 332 | 1,674 | 815 | 300–375 |

Table 2 shows the results of analyzing the reaction product obtained in each sample run to determine its composition. The amount of each component obtained is expressed in per cent, by weight, of the total weight of the reaction product. The products listed as "Boiling below 66° C." include compounds boiling below methyltrichlorosilane, e. g., methyldichlorosilane (CH₃SiHCl₂), silicon tetrachloride (either slight traces or absent), trimethylchlorosilane [(CH₃)₃SiCl] (present only as a trace in sample 1 and present up to about 5 per cent in sample 2), and negligible amounts of methyl chloride, etc. Dimethyldichlorosilane boiling at 70° C. at atmospheric pressure and methyltrichlorosilane boiling at 66° C. at atmospheric pressure are, therefore, the only products boiling at or above 66° C., exclusive of the amount of material included under the heading "Residue." Thus, the heading "Residue" is intended to refer to those products having a boiling range higher than dimethyldichlorosilane.

Table 2
Per cent by weight of the reaction product*

| Sample No. | Boiling Below 66° C. | CH₃SiCl₃ | (CH₃)₂SiCl₂ | Residue | In Per cent Si Converted to (CH₃)₂SiCl₂† | Weight (CH₃)₂SiCl₂ |
|---|---|---|---|---|---|---|
| | | | | | | Grams |
| 1 | 35.6 | 30.8 | 21.4 | 3.5 | 18.2 | 148 |
| 2 | 16.1 | 32.8 | 42.3 | 4.4 | 82.4 | 344 |

*The total per cent of the reaction product is not equal to 100 per cent in the above tests because of slight experimental errors and certain unpreventable handling losses.
†The values under this heading correspond to the approximate per cent, by weight, of silicon converted to dimethyldichlorosilane in accordance with the following formula:

$$\frac{\text{Weight of dimethyldichlorosilane} \times \frac{\text{Atomic weight of silicon}}{\text{Mol. wt. dimethyldichlorosilane}}}{\text{Weight of silicon charged to reactor}} \times 100$$

From the results of the foregoing examples it is apparent that by employing the cupreous powder as a catalyst in place of the copper oxide, it is possible to obtain a greater yield of the more desirable dimethyldichlorosilane. Not only is the increased yield of dimethyldichlorosilane obtainable but also the time in which the dimethyldichlorosilane is obtained and the rate at which the compound is formed is much greater in the case of the cupreous powder than in the case of the copper oxide.

EXAMPLE 2

In this example 90 lbs. finely divided silicon and 10 lbs. of the cupreous powder were charged to an oil-bath heated ribbon-type reactor, which is more particularly described and claimed in Sellers et al. application, Serial No. 633,818, filed December 8, 1945, and assigned to the same assignee as the instant application. Methyl chloride was passed through the powder bed while effecting agitation of the silicon and cupreous powders throughout the reaction chamber. For comparison, another run was conducted in the aforementioned reactor wherein the powder charge consisted of 90 lbs. finely divided silicon and 10 lbs. finely divided copper powder. The two runs were conducted within the oil bath temperature range of from about 250° to 260° C.

The products issuing from the exit end of the tube were condensed in the same manner as was done in Example 1. Tables 3 and 4 show the conditions of reaction used in each case and the results of analyzing the reaction products obtained. In the case of these two runs, the run was considered terminated when the weight of product for a one hour period was equal to less than one-half the weight of the methyl chloride used per hour. Sample 3 employed the cupreous powder while sample 4 used the copper powder as catalyst. The explanation with regard to the headings in Tables 1 and 2 apply to the corresponding headings in Tables 3 and 4.

Table 3

| Sample No. | Length of Run, Hours | Pounds Weight of Input $CH_3Cl$ | Pounds Weight of Reaction Product |
|---|---|---|---|
| 3 | 124 | 345 | 365 |
| 4 | 109 | 300 | 274 |

Table 4

| Sample No. | Per Cent By Weight of the Reaction Product* | | | | In Per cent Si Converted to $(CH_3)_2SiCl_2$† | Weight $(CH_3)_2SiCl_2$ |
|---|---|---|---|---|---|---|
| | Boiling Below 66° C. | $CH_3SiCl_3$ | $(CH_3)_2SiCl_2$ | Loss and Residue | | |
| | | | | | | Pounds |
| 3 | 13.3 | 11.8 | 65.6 | 9.3 | 59.4 | 239 |
| 4 | 12.7 | 15.3 | 59.3 | 12.6 | 39.7 | 160 |

From the results of the foregoing two runs it will be apparent that although sample run No. 3 was conducted for 15 hours more than sample run No. 4 (thus showing a greater productivity because of the continued required rate of yield), the results obtained far exceed any expectations based on the lengths of time during which methyl chloride was passed over the silicon. More particularly, these results established that the use of the cupreous powder resulted in about a 33 per cent greater yield of product, approximately a 50 per cent greater yield of dimethyldichlorosilane, and about a 50 per cent greater conversion of the silicon to dimethyldichlorosilane.

It will be understood by those skilled in the art that our invention is not limited to the specific alkyl halide used in the preceding illustrative examples, and that any other alkyl halide or mixtures of alkyl halides may be employed as a reactant with the silicon, the conditions of reaction generally being varied depending upon the particular end products desired. Among such alkyl halides are, for example, methyl bromide, ethyl chloride, propyl chloride, butyl chloride, isobutyl bromide, etc. In general the vapor phase reactions are preferred because they can be carried out more economically, may be controlled more easily, and may be directed toward the production of the desired dialkyldihalogenosilane.

Likewise the invention is not limited to the specific temperatures or temperature ranges mentioned in the example. However, the reaction temperature should not be so high as to cause an excessive deposition of carbon upon the unreacted silicon. In general the reaction temperature to be used will vary with, for instance, the particular alkyl halide employed, etc. At temperatures of the order of 175° C. the reaction proceeds much more slowly than at reaction temperatures around 200° to 400° C. At temperatures much above 450° C., in the case of methyl chloride, for example, there is a vigorous exothermic reaction which generally results in an undesirable deposition of carbon in the reaction tube. Optimum results usually are obtained within the range of from about 225° to 350° C.

The proportion of silicon to the cupreous powder may be varied over a wide range. Preferably, however, the mixture of powders consists substantially of a preponderant proportion of silicon and a minor proportion of the cupreous powder. Thus, we may use from about 2 to 50 per cent, by weight, of the cupreous powder based on the total weight of the silicon and cupreous powder. Particularly good results from a practical standpoint are obtained with a mixture of powders containing, by weight, from about 5 to 25 per cent of the total weight of the cupreous powder and the silicon.

With further reference to the production of methylchlorosilanes, it may be said that the efficient utilization of methyl chloride is enhanced as the proportion of the cupreous powder is increased up to about 15 per cent and that no material advantage from the standpoint of maximum yields of reaction products per unit weight of methyl chloride employed ordinarily accrues from using a mixture of powders containing much over 20 per cent, by weight, of the cupreous powder.

The products of this invention have utility as intermediates in the preparation of other products. For instance, they may be employed as starting materials for the manufacture of silicon resins. They may also be used as agents for treating water-nonrepellent bodies to make them water-repellent as disclosed and claimed in Patnode Patent U. S. 2,306,222, issued December 22, 1945, and assigned to the same assignee as the present invention.

What we claim as new and desire to secure by Letters Patent of the United States is:

1. The method for obtaining increased yields of dialkyldihalogenosilanes which comprises effecting reaction between heated silicon and an alkyl halide in the presence of a finely divided cupreous powder, the major portion of the particles of which are a few microns in size, and having as a principal constituent friable metallic copper core particles surrounded by protective surface films of cuprous oxide inhibiting oxidation in the air, said films being relatively thin as compared with the size of the enclosed copper cores, the amount of cuprous oxide on the individual cores being at least sufficient to be identified by present X-ray diffraction methods.

2. The method for obtaining increased yields of dimethyldichlorosilane which comprises effecting reaction between heated silicon and methyl chloride in the presence of a catalyst comprising a finely divided cupreous powder, the major portion of the particles of which are a few microns in size, and having as a principal constituent friable metallic copper core particles surrounded by protective surface films of cuprous oxide inhibiting oxidation in the air, said films being relatively thin as compared with the size of the enclosed copper cores, the amount of cuprous oxide on the individual cores being at least sufficient to be identified by present X-ray diffraction methods.

3. The method as in claim 2 wherein the methyl chloride is present in a form of a gas.

4. The method for obtaining increased yields of dimethyldichlorosilane which comprises effecting reaction at an elevated temperature between silicon and methyl chloride in the presence of a finely divided cupreous powder, the major portion of the particles of which are a few microns in size, and having as a principal constituent friable metallic copper core particles surrounded by protective surface films of cuprous oxide inhibiting oxidation in the air, said films being relatively thin as compared with the size of the enclosed copper cores, the amount of cuprous oxide on the individual cores being at least sufficient to be identified by present X-ray diffraction methods.

5. The method for obtaining increased yields of dimethyldichlorosilane which comprises effecting reaction at a temperature of from about 200° to 450° C. between silicon and methyl chloride in the presence of a catalyst comprising a finely divided cupreous powder, the major portion of the particles of which are a few microns in size, and having as a principal constituent friable metallic copper core particles surrounded by protective surface films of cuprous oxide inhibiting oxidation in the air, said films being relatively thin as compared with the size of the enclosed copper cores, the amount of cuprous oxide on the individual cores being at least sufficient to be identified by present X-ray diffraction methods, the said catalyst being present in an amount equal to from about 5 to 25 per cent, by weight, of the total weight of the catalyst and silicon.

CHARLES S. FERGUSON.
JESSE E. SELLERS.